United States Patent [19]

Crawford et al.

[11] 4,217,678
[45] Aug. 19, 1980

[54] POULTRY PICKING MACHINE

[75] Inventors: David R. Crawford, Independence, Mo.; David M. McDonald, Kansas City, Kans.

[73] Assignee: Simon-Johnson Inc., Kansas City, Mo.

[21] Appl. No.: 958,249

[22] Filed: Nov. 6, 1978

[51] Int. Cl.² .............................................. A22C 21/02
[52] U.S. Cl. ................................................ 17/11.1 R
[58] Field of Search .......................... 17/11.1 R, 47, 64

[56] References Cited

U.S. PATENT DOCUMENTS

| | | | |
|---|---|---|---|
| 3,273,198 | 9/1966 | Tomlinson | 17/11.1 R |
| 3,402,424 | 9/1968 | Brown et al. | 17/11.1 R |
| 3,471,893 | 10/1969 | Zebarth et al. | 17/11.1 R |
| 3,524,217 | 8/1970 | Schuster | 17/11.1 R |
| 3,585,675 | 6/1971 | Crane | 17/11.1 R |

FOREIGN PATENT DOCUMENTS

| | | | |
|---|---|---|---|
| 1437370 | 5/1976 | United Kingdom | 17/11.1 R |
| 306825 | 10/1971 | U.S.S.R. | 17/11.1 R |

Primary Examiner—Willie G. Abercrombie

Attorney, Agent, or Firm—Schmidt, Johnson, Hovey & Williams

[57] ABSTRACT

The machine has two laterally separated banks of pickers located on opposite sides of the path of travel of poultry carcasses conveyed through the machine. Each bank includes three horizontally extending lines of rotary pickers set in spaced opposition to the corresponding lines of pickers on the opposite bank so as to define a picking zone therebetween. The two banks may be rocked about a pair of respective horizontal axes extending parallel to the path of travel so as to adjust the shape of the picking zone to the extent needed for optimum performance, i.e., rocking the banks inwardly toward one another at their upper corners correspondingly brings the upper pickers closer together while separating the lower pickers and, on the other hand, rocking the banks toward one another at their lower corners causes the lower pickers to be brought closer to one another while the upper pickers are spaced further apart. The intermediate or middle lines of pickers are independently adjustable toward and away from one another relative to the other pickers, and both banks may be bodily shifted toward and away from one another to expand or contract the picking zone as may be necessary or desirable.

11 Claims, 7 Drawing Figures

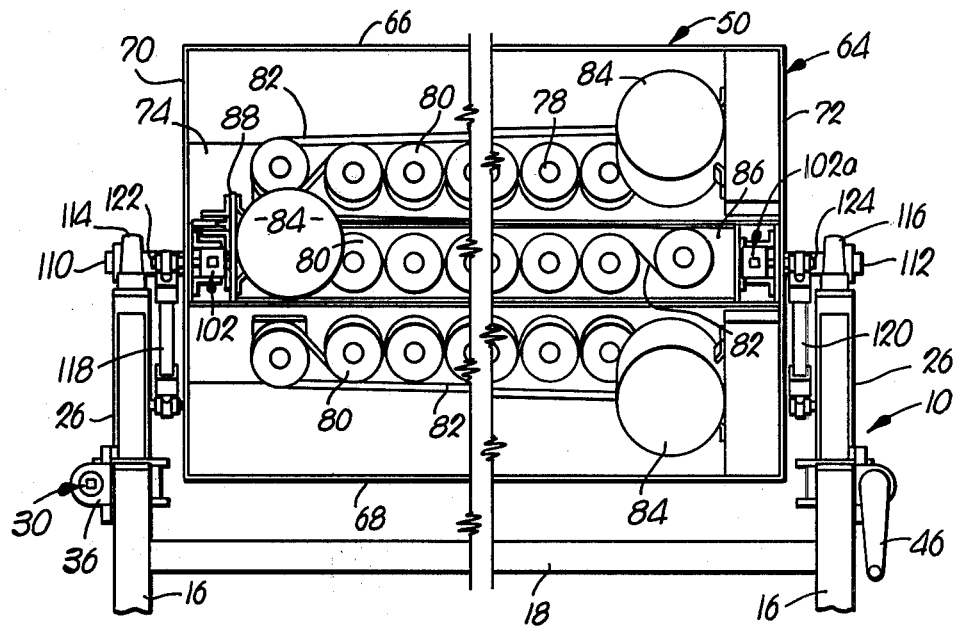
Fig.2.
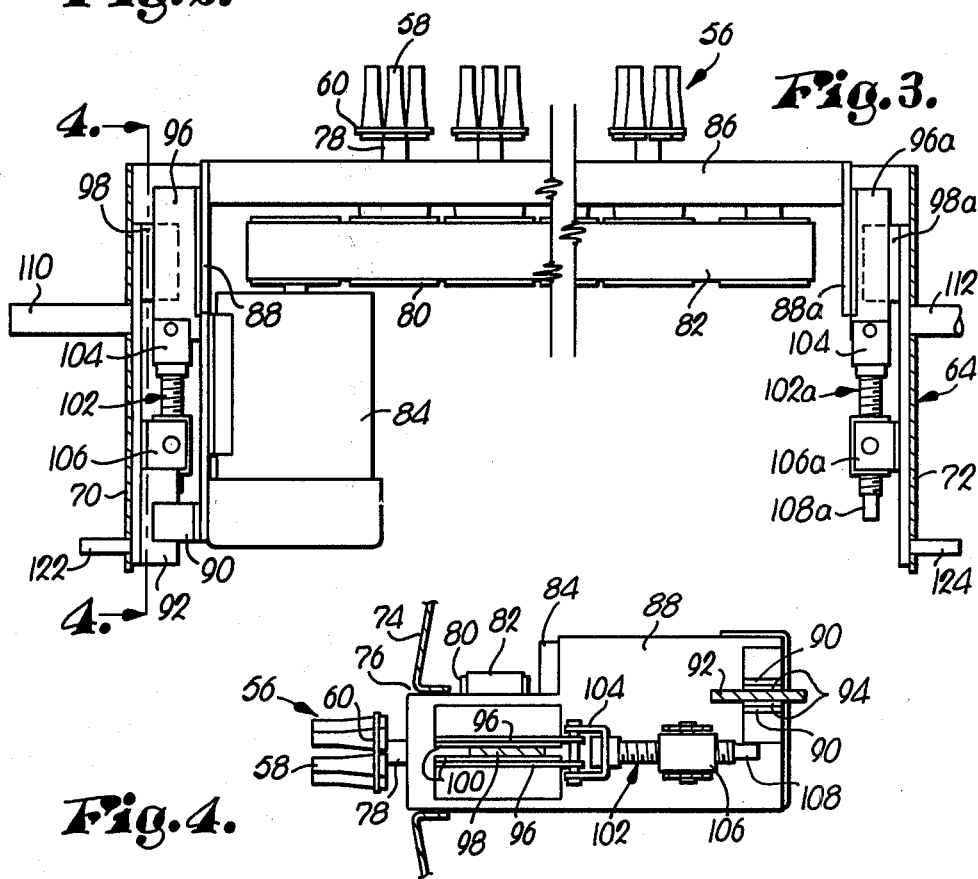
Fig.3.
Fig.4.

POULTRY PICKING MACHINE

Technical Field

This invention relates to improvements in machines for removing the feathers from poultry carcasses and, more particularly, to advances in the way in which the pickers of such machines may be adjusted to provide the most effective picking action.

Background Art

High speed picking machines typically employ pickers on opposite sides of the path of travel of poultry carcasses conveyed through the machines. Not infrequently, the birds of one lot may vary substantially in size and other characteristics from the birds of another lot, thereby necessitating adjustment in the shape of the picking zone defined between the opposed sets of pickers. Furthermore, the adjustment may need to be greater in the leg and thigh area, for example, than the neck and/or body area, thereby necessitating a degree of adjustment flexibility.

On the other hand, in order to maximize production output, it is desirable to minimize "down time" during which such adjustments are made, and if the particular picking machine utilized by a processing plant is so designed that making such adjustments is particularly difficult and time consuming, substantial revenues can be lost.

Summary Of The Present Invention

Accordingly, one object of the present invention is to provide the degree of adjustment flexibility that is necessary to accomodate day-to-day variations in bird sizes and picking characteristics, and yet maintain the particular means of carrying out the required adjustments as simple as possible and as least time consuming as possible.

Pursuant to this objective, the picking machine of the present invention includes banks of pickers disposed on opposite lateral sides of the path of travel of birds through the machine. Each bank includes three lines of pickers that extend horizontally along the path of bird travel so as to present an upper line of pickers, a lower line of pickers and an intermediate line of pickers. The two banks are mounted on trunnions that permit the banks to rock about a pair of axis extending parallel to the path of bird travel such that, when adjusters are manipulated, the banks can be tipped either inwardly toward one another along their top corners and outwardly along their bottom corners, or outwardly along their upper corners and inwardly along their lower corners. This has the result of changing the shape of the picking zone.

The intermediate lines of pickers are mounted in such a way that they can be independently adjusted relative to the other pickers inwardly and outwardly toward and away from one another. This affords yet an additional means of adjustment if such is desired, and, if the picking zone as a whole needs to be expanded or contracted, this is accomplished by moving the banks bodily toward or away from one another on their supporting tracks as may be necessary or desirable.

Hence, the picking zone as a whole may be increased or decreased in lateral dimensions. Furthermore, the hock area and the shoulder areas may be readily adjusted simply by rocking the banks in the appropriate directions, while the central body areas can be adjusted if necessary by simply moving the intermediate lines of pickers toward or away from one another.

Brief Description Of The Drawings

FIG. 2 is a fragmentary side elevational view of the machine revealing the interior of one picking bank of the machine;

FIG. 3 is a fragmentary, horizontal cross-sectional view through one bank taken just above the intermediate line of pickers thereof;

FIG. 4 is a vertical cross-sectional view on a fragmentary basis of the bank of FIG. 3 taken along line 4—4 of FIG. 3;

Detailed Description

Figure 1:
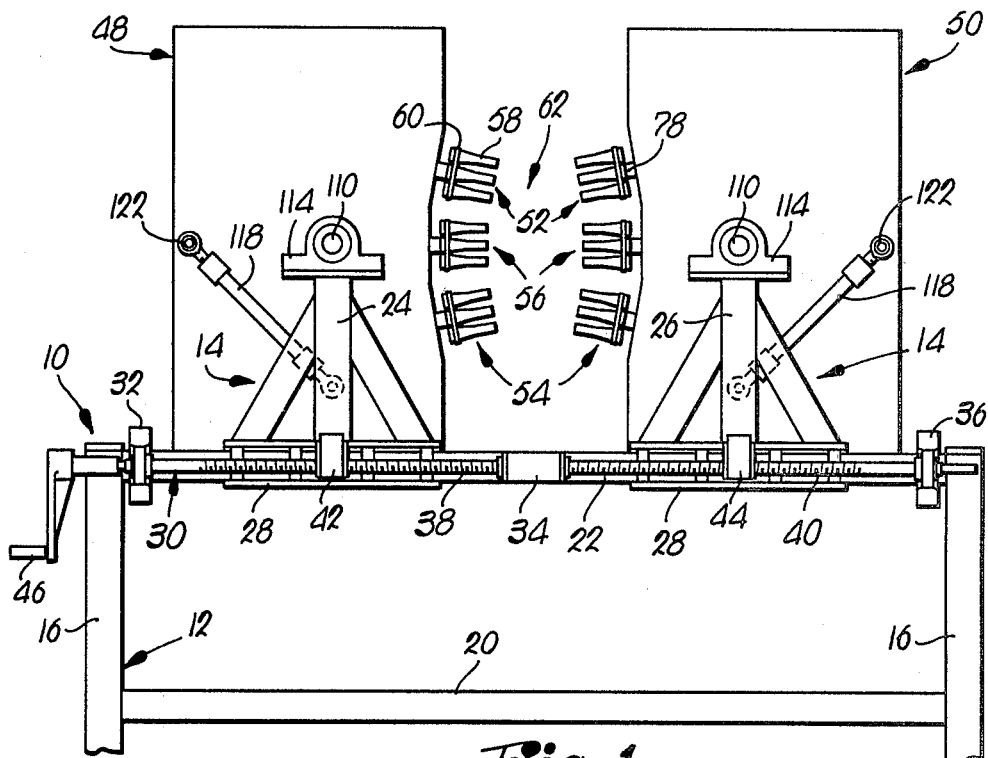
FIG. 1 is an end elevational view of a machine constructed in accordance with the principles of the present invention.

The machine as illustrated in the drawings includes a frame 10 including a lower stationary section 12 and a pair of upper movable sections 14. The stationary section 12 includes upright posts 16 at the four corners of the machine, longitudinally extending beams 18 between the posts 16 on opposite sides of the machine, transversely extending beams 20 interconnecting the posts 16 on opposite ends of the machine, and a pair of upper transverse beams 22 at opposite ends of the machine that interconnect the end posts 16 and serve also as tracks for the movable sections 14 as described below.

The movable sections 14 of the frame 10 include a pair of uprights 24 and 26 on each of the track beams 22. Each of the uprights 24, 26 includes a lower, horizontally extending, generally tubular portion 28 that slidingly receives the track beam 22 such that the uprights 24, 26 are rendered movable along their track beams 22. For effecting such movement, a screw 30 is rotatably supported along each of the track beams 22 by bearings 32, 34 and 36 and includes a pair of oppositely threaded segments 38 and 40 threadably received by nuts 42 and 44 on respective ones of the uprights 24 and 26. Consequently, when the cranks 46 of screws 30 are operated, the uprights 24 and 26 are simultaneously either drawn together or forced apart along the track beams 22.

The movable sections 14 of the frame 10 support two banks 48 and 50 of pickers which are arranged along the path of travel of bird carcasses through the machine. More specifically, each of the banks 48, 50 includes a top or upper line of pickers 52, a lower line of pickers 54 spaced below the upper line 52, and a middle or intermediate line of pickers 56 located midway between the upper and lower lines 52 and 54 respectively. The pickers of each line 52, 54 and 56 are of the rotary "disc picker" type generally well known to those skilled in the art, and hence details of construction of each of the pickers will not be set forth herein. Suffice it to point out that each of the rotary pickers is provided with a plurality of rubber picking fingers 58 mounted on a disc 60 in a circular pattern so that as the disc is rotated, the rapidly moving outermost tips of the fingers 58 may be engaged with the feathers of poultry carcasses such as to intertwine with the feathers and "spin" them off the carcass.

Each of the lines of pickers 52, 54 and 56 extends substantially the full length of the corresponding bank 48 or 50 in a horizontal direction parallel to the path of travel of poultry carcasses through the machine. As noted from the figures, corresponding lines of the pickers on the banks 48, 50 are situated in direct opposition to one another across the path of travel of carcasses through the machine, and the distance between such opposing lines creates a space between the pickers that may be identified as the picking zone 62 whose lateral dimensions and configuration are determined by the relative positions of the upper lines 52, the lower lines 54 and the intermediate lines 56.

The banks 48 and 50 are identical in construction to one another, and hence only details of the bank 50 will be set forth, it being understood that corresponding components of the bank 48 will be denoted by the same numerals used in connection with components of the bank 50. Hence, as shown in FIGS. 2, 3, and 4, the bank 50 includes a box-like chassis 64 having a top wall 66, a bottom wall 68, a pair of end walls 70 and 72, and a front wall 74 having a slot 76 therein at its vertical midpoint which extends the full length of the chassis 64 and serves as a clearance opening for the intermediate line of pickers 56 as will subsequently become clear. The back side of the chassis 64 is open so as to permit access to the various mechanisms within the chassis 64.

The pickers of the upper line 52 and the lower line 54 are supported directly by the front wall 74 such that, although the individual pickers rotate relative to the front wall 74, they are not otherwise adjustable relative to the front wall 74. The drive shafts 78 of the pickers in lines 52 and 54 extend rearwardly from the discs 60 through the front wall 74 and into respective ones of a horizontal series of cylindrical housings or hubs 80 that are in turn entrained by a drive belt 82 ultimately connected to the output of a motor 84 mounted on the end wall 72. The belt 82 is looped alternately over and under adjacent ones of the hubs in the series so as to drive adjacent pickers in opposite rotative directions. It should be pointed out that through means not shown, each of the pickers is mechanically attached to the front wall 74 in such a way as to permit rotation of the fingers 58, the discs 60, the shafts 78 and the hubs 80 and yet preclude other shifting of such components relative to the wall 74 as above briefly stated. It is of course also clear that the upper line of pickers 52 has its own belt 82 and motor 84 separate and apart from the lower line of pickers 54 as well shown in FIG. 2.

The intermediate line of pickers 56 includes a transversely U-shaped channel or beam 86 (see also FIG. 5) which extends substantially the full length of the chassis 64 and is ultimately supported at its opposite ends in an indirect manner by the two end walls 70 and 72 serving as transverse structural members. The specific manner of supporting the beam 86 on the end wall 70 and 72 will be discussed below, but prior to that it should be pointed out that the pickers of line 56, like the pickers of lines 52 and 54, have their drive shafts 78 fixed interiorly of the chassis 64 to respective ones of a series of cylindrical hubs 80 which are in turn driven in alternate directions by a belt 82. The motor 84 for the pickers of the intermediate line 56, in contrast to the motors 84 of upper and lower lines 52 and 54, is mounted at the left end of the series of pickers viewing FIG. 2. Specifically, the motor 84 for the intermediate line 56 is attached to a plate 88 secured to the left end of the beam 86 viewing FIGS. 2 and 3 and extending rearwardly into the interior of the chassis 64.

The intermediate line of pickers 56 is bodily shiftable in a transverse direction relative to the chassis 64 by virtue of the way in which the beam 86 is carried by the end walls 70 and 72 serving as structural members. To this end, the plate 88 used to attach the motor 84 to the beam 86 for movement therewith is provided with a rearmost set of upper and lower, vertically spaced apart ears 90 projecting from the side of plate 88 opposite to the motor 84 and receiving therebetween a horizontally disposed guide flange 92 projecting inwardly toward the plate 88 from the end wall 70. Anti-friction pads 94 attached to respective ones of the ears 90 embrace the flange 92 to facilitate sliding. At the front end of the plate 88, a similar arrangement is provided wherein a pair of upper and lower vertically spaced lugs 96 project outwardly toward the end wall 70 from the plate 88 on opposite upper and lower sides of a front guide flange 98 extending inwardly from the wall 70 toward the plate 88. Again, anti-friction pads 100 are disposed on opposite ones of the lugs 96 so as to slidingly embrace the front flange 98. An arrangement corresponding to lugs 96 and front flange 98 is provided at the opposite end of the chassis 64 where, as shown in FIG. 3, the flange 98a projecting inwardly from the end wall 72 is received between lugs 96a fixed to a short plate 88a on the corresponding end of the beam 86.

Figure 5:
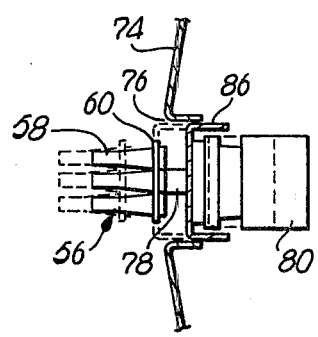
FIG. 5 is a fragmentary detail view similar to FIG. 4 but illustrating the way in which the intermediate line of pickers can be independently adjusted.

A pair of identical screw adjusters 102 and 102a are provided at opposite ends of the beam 86 for shifting the later bodily inwardly and outwardly through the slot 76 between the extreme positions illustrated in FIG. 5. Each of the adjusters 102 and 102a is pivotally attached via a yoke 104 at its forwardmost end to the corresponding lug 96 or 96a and is threadably received by a nut 106 or 106a intermediate its two opposite ends. The nuts 106 and 106a are in turn fixed to the corresponding end walls 70 or 72 such that rotation of the screws 102 and 102a by a tool (not shown) applied to the flatted rearmost ends 108 and 108a of the screws 102 and 102a results in shifting of the beam 86 and hence of the intermediate line of pickers 56.

The two end walls 70 and 72 are provided with respective, outwardly projecting trunnions 110 and 112, such trunnions 110 and 112 being located substantially at the same vertical level as the intermediate line of pickers 56 and slightly forwardly of a midpoint of the chassis 64 in a fore-and-aft horizontal direction. Trunnions 110 and 112 are in turn received rotatably within respective ones of a pair of pillow block bearings 114 and 116 secured to the uppermost ends of the two uprights 26. A pair of turnbuckles 118 and 120 located at opposite ends of the chassis 64 extend diagonally between respective pivots 122 and 124 on the chassis 64 and corresponding ones of the uprights 26 such that, by operating the turnbuckles 118 and 120, the entire bank 50 may be rocked about the longitudinal axes defined by the aligned trunnions 110 and 112.

In use of the machine, poultry carcasses are normally suspended by their feet from shackles attached to an overhead conveying line which is so oriented that the carcasses are successively passed between the banks 48 and 50 through the picking zone 62 for the full length of the machine. If the overall width of the picking zone 62 needs to be increased or decreased to accommodate the particular characteristics of one lot of birds being defeathered, it is but necessary to operate the cranks 46 in the appropriate direction to cause movement of the banks 48 and 50 bodily toward one another or away from one another as may be desired.

Figure 6:
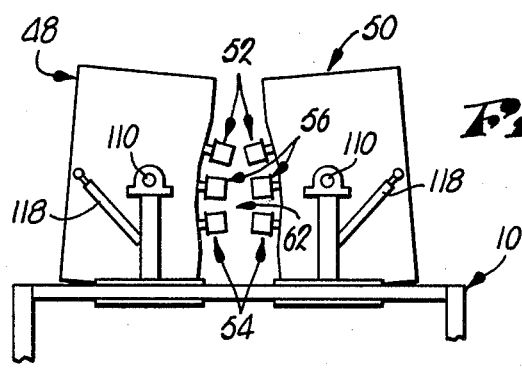
FIGS. 6 and 7 are schematic views of the machine on a reduced basis illustrating the way in which the banks may be rocked in opposite directions to adjust the pickers.

If additional picking pressure is required in the hock and leg area of the birds, for example, and because this area is normally handled by the upper line of pickers 52, the turnbuckles 118 and 120 are simply operated in the appropriate directions so as to cause the upper corners of the banks 48 and 50 to tip inwardly toward one another as illustrated schematically in FIG. 6. This brings the upper lines of pickers 52 closer together than illustrated in the nominal position of FIG. 1 and also has the effect of slightly separating the lower line of pickers 54. If such separation of the lower lines 54 is not desired, then this separating adjustment can be counteracted by simply operating the cranks 46 to move the banks 48 and 50 closer together to the extent necessary, perhaps also at the same time backing off the turnbuckles 118 and 120 slightly to separate the upper lines 52 in counteraction to the bodily movement of the banks 48 and 50 toward one another.

Figure 7:
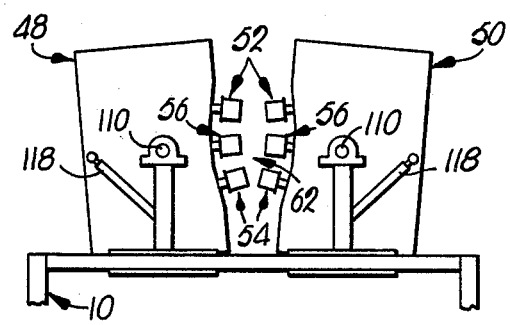

If, on the other hand, additional pressure is required in the lower neck area of the carcasses, operation of the turnbuckles 118 and 120 in the appropriate directions can result in the banks 48 and 50 being tipped toward one another at their lower corners as illustrated in FIG. 7. This also effects a slight separation of the upper line of pickers 52 which, if desired, can be counteracted by bodily movement of the banks 48 and 50 toward one another using the cranks 46.

Additionally, it must be pointed out that the configuration of the picking zone 62 can also be varied and the spacing between the intermediate lines 56 adjusted by operating the adjusters 102 and 102a to the extent necessary to shift the lines 56 toward or away from one another. By shifting the intermediate lines of pickers 56 toward and away from one another, the picking pressure against the main body portion of the carcasses can be adjusted without simultaneously disrupting the relationship of the upper and lower lines of pickers 52 and 54. Thus, if desired, the banks 48 and 50 may be disposed in strictly "upright" positions as illustrated in FIG. 1 with equal spacing between the upper lines 52 and lower lines 54. Without operating the turnbuckles 118 and 120, the adjusters 102 and 102a may be operated to move the lines 56 toward or away from one another as may be necessary or desirable. On the other hand, such adjustment of the intermediate lines 56 relative to the upper and lower lines 52 and 54 may be utilized when the banks 48 and 50 are tilted in either of the manners illustrated in FIGS. 6 and 7 so as to appropriately accomodate for a greater or lesser degree of pressure in the main body portion that may be caused as a result of such tilting.

Accordingly, it should be apparent from the foregoing that the present invention provides an extremely high degree of flexibility insofar as adjusting the configuration of the picking zone 62 is concerned and with respect to varying the pressure applied by the respective lines of pickers 52, 54 and 56. Yet, adjustments can be carried out quickly and simply to the end that costly down time during which birds are not processed can be held to a minimum.

We claim:

1. A machine for picking the feathers from poultry carcasses advanced in succession along a predetermined path of travel, said machine comprising:

a frame;

two banks of pickers carried by said frame for disposition on opposite lateral sides of said path of travel, each bank including a normally upper line of several individual pickers extending along said path of travel in spaced opposition to a corresponding upper line of several individual pickers on the other bank, each bank further including a normally lower line of several individual pickers extending along said path of travel in spaced opposition to a corresponding lower line of several individual pickers on the other bank;

means mounting said banks on the frame for rocking movement about respective ones of a pair of horizontal axes extending along said path of travel; and selectively operable adjuster mechanism between said frame and the banks for effecting said rocking movement of the banks to thereby adjust the shape of the picking zone defined between the opposed lines of pickers by adjusting all individual pickers of each bank simultaneously.

2. A machine as claimed in claim 1, wherein each bank further includes an intermediate line of several individual pickers between the corresponding upper and lower lines, extending along said path of travel, and disposed in spaced opposition to a corresponding intermediate line of several individual pickers on the other bank.

3. A machine as claimed in claim 2, wherein said intermediate lines are also mounted for adjustment toward and away from one another independently of said upper and lower lines.

4. A machine as claimed in claim 3, wherein each of said banks includes an elongated chassis and said mounting means includes a pair of trunnions at longitudinally opposite ends of the chassis, said upper and lower lines being fixed to the chassis and said intermediate line being slidably carried by said chassis for adjustment laterally of the latter.

5. A machine as claimed in claim 4, wherein said chassis includes a pair of transverse structural members at said opposite ends of the chassis, said intermediate line including a beam extending between and slidably supported at opposite ends by said members, said beam carrying a plurality of pickers at longitudinally spaced locations along the latter.

6. A machine as claimed in claim 5, wherein each of said members is provided with an adjuster device connecting the member with a corresponding end of the beam for effecting said sliding adjustment of the beam.

7. A machine as claimed in claim 1, wherein said adjuster mechanism includes a turnbuckle for each bank connected at one end to said frame and at the other end to the corresponding bank at a location radially spaced from the axis of rocking movement of the bank.

8. A machine as claimed in claim 1, wherein said frame includes a stationary section having transverse tracks and movable sections carried by said tracks for adjusting movement toward and away from one another on opposite lateral sides of said path of travel, said movable sections supporting said banks whereby the banks are adjusted toward and away from one another during said adjusting movement of the movable sections.

9. A machine as claimed in claim 8, wherein said movable sections each include a pair of uprights at opposite ends of each bank, said mounting means for each bank including a pair of trunnions associated with said uprights at opposite ends of the bank.

10. A machine as claimed in claim 9, wherein each bank further includes an intermediate line of several individual pickers between the upper and lower line thereof in spaced opposition to a corresponding intermediate line of several individual pickers on the other bank, said intermediate lines being shiftable toward and away from one another independently of said upper and lower lines.

11. A machine as claimed in claim 1, wherein each of said pickers includes a support generally facing said path of travel and rotatable about an axis transverse to said path of travel, each picker further including a plurality of elongated, flexible picking fingers projecting outwardly from the face of the support and rotatable therewith about said axis.

* * * * *